United States Patent
Massen

(10) Patent No.: US 6,945,346 B2
(45) Date of Patent: Sep. 20, 2005

(54) METHOD FOR OPERATING A DRIVER SUPPORT SYSTEM FOR MOTOR VEHICLES

(75) Inventor: Joachim Massen, Munich (DE)

(73) Assignee: Automotive Distance Control Systems GmbH, Lindau (DE)

( * ) Notice: Subject to any disclaimer, the term of this patent is extended or adjusted under 35 U.S.C. 154(b) by 149 days.

(21) Appl. No.: 10/363,932

(22) PCT Filed: Sep. 5, 2001

(86) PCT No.: PCT/EP01/10192

§ 371 (c)(1),
(2), (4) Date: Mar. 7, 2002

(87) PCT Pub. No.: WO02/27351

PCT Pub. Date: Apr. 4, 2002

(65) Prior Publication Data

US 2003/0168271 A1 Sep. 11, 2003

(30) Foreign Application Priority Data

Sep. 28, 2000 (DE) .......................... 100 48 102

(51) Int. Cl.⁷ .............................................. B60K 31/00
(52) U.S. Cl. ........................ 180/170; 180/169; 701/93; 701/96
(58) Field of Search ................................ 180/170, 333, 180/169; 701/93, 96; 340/435, 904

(56) References Cited

U.S. PATENT DOCUMENTS

| | | | | |
|---|---|---|---|---|
| 4,670,845 A | * | 6/1987 | Etoh | 701/301 |
| 4,706,195 A | * | 11/1987 | Yoshino et al. | 701/96 |
| 5,053,979 A | * | 10/1991 | Etoh | 700/304 |
| 5,166,881 A | * | 11/1992 | Akasu | 701/96 |
| 5,197,562 A | * | 3/1993 | Kakinami et al. | 180/169 |
| 5,335,743 A | * | 8/1994 | Gillbrand et al. | 180/178 |
| 5,695,020 A | * | 12/1997 | Nishimura | 180/169 |
| 5,745,870 A | | 4/1998 | Yamamoto et al. | |
| 5,767,466 A | * | 6/1998 | Durrani | 200/61.54 |
| 5,771,481 A | * | 6/1998 | Gilling | 701/93 |
| 6,324,463 B1 | * | 11/2001 | Patel | 701/93 |
| 6,370,471 B1 | * | 4/2002 | Lohner et al. | 701/96 |
| 6,373,472 B1 | * | 4/2002 | Palalau et al. | 345/173 |
| 6,438,491 B1 | * | 8/2002 | Farmer | 701/301 |
| 6,554,090 B1 | * | 4/2003 | Kuroda et al. | 180/170 |

FOREIGN PATENT DOCUMENTS

| | | |
|---|---|---|
| DE | 32 22 263 | 2/1983 |
| DE | 19821163 | 11/1999 |
| DE | 19851434 | 5/2000 |
| EP | 0590588 A2 | 4/1994 |
| EP | 07820008 | 7/1997 |

* cited by examiner

Primary Examiner—Chis Ellis
Assistant Examiner—Christopher Bottroff
(74) Attorney, Agent, or Firm—W. F. Fasse; W. G. Fasse

(57) ABSTRACT

A support of the operator of the motor vehicle is to be provided in all traffic situations in a simple manner and with low costs, without overburdening the operator of the motor vehicle. In this context, in the following or tracking operation, in which a regulation of the speed of the motor vehicle dependent on the spacing distance to detected target objects that are classified as relevant is carried out, the relevant target objects used for the speed regulation are selected by the operation of an operating element to be operated by the operator of the motor vehicle.

26 Claims, 2 Drawing Sheets

METHOD FOR OPERATING A DRIVER
SUPPORT SYSTEM FOR MOTOR VEHICLES

BACKGROUND OF THE INVENTION

Driver support or assistance systems for supporting and unburdening the operators of motor vehicles have been in testing for several years and partially already on the market. In this context, especially spacing distance controlled speed regulation systems, so-called ACC systems (Adaptive Cruise Control) are to be mentioned, with which target objects are automatically detected in higher speed ranges of the motor vehicle (approx. 40 km/h to 160 km/h), and target objects that are classified as relevant for one's own driving are reacted to comfortably, that is to say with limited acceleration or deceleration values, by adaptation of one's own driving speed. Additionally, the operator of the motor vehicle can be informed regarding the "danger potential" of target objects by (for example optical or acoustical) warning devices, and can be warned of potential collisions with rapidly approaching obstacles. The driver assistance systems are generally switched on and off manually by the operator of the motor vehicle, and can be overridden and/or deactivated by the driver.

It is desirable to expand the speed range of the motor vehicle for the speed regulation system toward lower vehicle speeds, and especially also to carry out a regulation of the speed of one's own motor vehicle all the way to a standstill; hereby, for example, a "stop and go" function can be realized, by means of which, upon approaching a traffic jam, it is possible to automatically close ranks up to the already-stopped last vehicle or to stop before other obstacles. However, the acceptance of a larger speed range for the speed regulation, and the desire to have a speed adaptation that is automatic to the extent possible in the approaching phase to resting (very slow or standing) target objects, requires a high deceleration capacity of the speed regulation system and also the inclusion of stationary target objects (especially standing obstacles) into the regulation concept.

In known driver assistance systems, two different operating modes are defined: in the EP 0,590,588 B1, a normal driving mode is provided for the "normal" speed range and an overload driving mode is provided for low vehicle speeds (for example stop and go); in the spacing distance warning system of the DE 32 22 263 A1, a switch-over between two operating modes (selective monitoring for the complex traffic, typical conventional spacing distance monitoring for the "normal" traffic) is carried out automatically or manually. In this regard it is disadvantageous that the transitions between the two operating modes are complicated, that the constant differentiation between the two operating modes overburdens the operator of the motor vehicle (especially the operator often does not know in which operating mode he is situated at the moment), and that erroneous reactions of the system in the form of an unsubstantiated braking reaction result in decelerations that are often abrupt for the operator of the motor vehicle (it must be made possible for the motor vehicle to stop automatically before a stationary or standing obstacle), whereby the acceptance of such a driver assistance system by the operator of the motor vehicle is greatly impaired.

SUMMARY OF THE INVENTION

It is the underlying object of the invention to propose a method of operating a driver assistance system, with which a simply operatable, powerful and efficient driver assistance system over the entire speed range of the motor vehicle, with a high safety and reliability, as well as a high acceptance by the operator of the motor vehicle, is provided.

This object is achieved according to the invention in a method of operating a driver assistance system for motor vehicles, in which, in a following operation of a motor vehicle following another vehicle, a speed regulation of the speed of the motor vehicle dependent on the spacing distance to target objects that have been detected and classified as relevant is carried out, characterized in that the relevant target objects taken into account for the speed regulation in the following operation are selected by an operation of an operating element by an operator of the motor vehicle, and characterized in that, in the selection of the relevant target objects taken into account for the speed regulation, only moving target objects are taken into account in a first operating condition and both moving target objects and resting target objects are taken into account in a second operating condition, and switching between said first and second operating conditions is effectuated by the operation of the operating element by the operator of the motor vehicle.

The invention is based on the underlying recognition, that a significant improvement of the system capability of the driver assistance system is achieved, and simultaneously the trust of the operator in the driver assistance system enabling a speed regulation all the way to a standstill of the motor vehicle is increased, by inclusion or involvement of the operator of the motor vehicle in only relatively infrequently arising driving situations. Therefore, according to the invention, for a driver assistance system ensuring the driving comfort and safety, the relevant target objects that are taken into consideration for the speed regulation in the following or tracking operation mode are selected among the detected (acquired) target objects dependent on their speed, and dependent on an operation or actuation of an operating element arranged in the motor vehicle, carried out by the operator of the motor vehicle; especially among the detected (acquired) target objects, target objects that are moving and classified as relevant target objects are automatically (always) taken into account for the speed regulation, resting (stationary) target objects (for example standing obstacles), in comparison, only upon the request of the operator of the motor vehicle, that is to say by the operation or actuation of the operating element arranged in the motor vehicle. Target objects with a very low speed are categorized as resting (stationary) target objects (for example pedestrians or very slow vehicles or standing vehicles), especially such target objects of which the speed is below a prescribed threshold value (for example all target objects with a speed of less than 5 km/h). Especially, all resting target objects that are detected and classified as relevant target objects can be taken into consideration for the speed regulation, especially all target objects that are detected and classified as relevant target objects are stored and taken into consideration in the speed regulation during their relevance until the deactivation of the driver assistance system.

The resting target objects are, however, preferably taken into consideration in the selection of the relevant target objects for the speed regulation only in a sharply time-limited manner, especially directly in connection with the operation or actuation of the operating element by the operator of the motor vehicle, especially either only during the duration of the operation or actuation of the operating element by the operator of the motor vehicle and/or a short time span after the operation or actuation of the operating element carried out by the operator of the motor vehicle (for example 2 seconds to 3 seconds after the operation carried out by the operator of the motor vehicle). Moreover, the resting target objects that have been detected (acquired) and classified as relevant target objects already before the operation or actuation of the operating element can be selected for the speed regulation by the operation or actuation of the operating element carried out by the operator of the motor vehicle, that is to say can be "confirmed" or "acknowledged" by the operator of the motor vehicle; this acknowledgment or confirmation can be carried out directly following an information of the operator of the motor vehicle regarding the potential relevant target objects, for example by an optical information of the operator of the motor vehicle, for example by means of indicator elements (for example in a display) of an indicator unit.

Because resting target objects can only be taken into consideration for the speed regulation in connection with the activity of the operator of the motor vehicle, the operator of the motor vehicle is cognizant of his action and is also not overburdened: On the one hand, a reaction of the driver assistance system to a resting target object (a stationary erroneous target) that is erroneously taken into consideration in the speed regulation, also only arises directly in connection with the operation or actuation of the operating element by the operator of the motor vehicle, so that the operator of the motor vehicle already expects a certain vehicle reaction and thus is prepared for this reaction, that is to say a possible erroneous reaction of the driver assistance system (which typically involves a sharp deceleration of the motor vehicle) does not meet upon the driver completely unprepared. On the other hand, during the consideration of resting target objects in the selection of the target objects relevant for the speed regulation, the input values or regulation values (regulation parameters) utilized for the following or tracking operation mode and therewith for the speed regulation can be changed or varied in such a manner, especially can be prescribed as "more critical" (that is to say, more-critical threshold values can be allocated thereto), so that the regulation and therewith the driver assistance system becomes more sensitive and quicker, in that the regulation time and/or the reaction time of the speed regulation is shortened; especially, for example, the observation distance (the maximum spacing distance for the selection of relevant target objects by the distance sensor of the driver assistance system) can be extended, the redundancy of the observation time (the number of the measuring cycles required for the classification of the target objects, especially the repetition of the measuring cycles required for the classification of the target objects as relevant target objects) can be reduced, or the values affecting or applying to the deceleration (for example the change of the deceleration of the motor vehicle or the maximum permissible deceleration of the motor vehicle) can be increased. Thus, one obtains a robust interference-insensitive driving operation in combination with a sensible, rapid reaction to standing obstacles.

In the presented driver assistance system, the following or tracking operation mode, that is to say the spacing distance dependent speed regulation, is provided in a single operating mode, especially for the range of low speeds all the way to a standstill of the own motor vehicle. The operator of the motor vehicle can thus predict or foresee the corresponding behavior of the own motor vehicle in each situation, so that a driver assistance system is realized, which is transparent and easily operatable for the operator. The operating effort or burden for the operator of the motor vehicle can be held low especially also if further functions of the driver assistance system are allocated to the operating element; especially, through the operation of the operating element with a deactivated driver assistance system, the activation of the driver assistance system can be made possible, and after a standstill of the motor vehicle the release of the following operation mode (the starting release for the further driving of the motor vehicle) can be made possible upon the removal of the relevant target object. Especially, upon an operation of the operating element, the adequate reaction of the driver assistance system (activation of the driver assistance system or consideration of resting target objects as relevant target objects or release of the following operation mode) occurs automatically and unambiguously on the basis of the momentary driving condition of the motor vehicle, that is to say the system condition (operating condition) of the driver assistance system and the driving situation of the motor vehicle (especially the own speed of the motor vehicle). Hereby, a comfortable support is provided for the operator of the motor vehicle especially for the operation on highways, primary roads, and inner-city major traffic thoroughfares, by means of the reaction, initiated by him, to resting target objects (for example stopped vehicles as obstacles) and the resumption of the following operation mode upon a further motion of the resting target object. This especially applies for particularly tiring traffic jam situations, that is to say if in nearly still-standing traffic a further motion only proceeds at a walking pace; in this context, after the reaction to already-stopped vehicles at the tail end of the traffic jam and, as the case may be, after the standstill (stopping) of the own motor vehicle has occurred, it is made possible to return to the following operation mode, whereby upon removal of the relevant target object, either an automatic starting to drive with a low speed, that is to say an automatic creep driving can be taken up (especially in order to adapt oneself to the typical traffic jam motion), and only through the operation of the operating element a following operation with normal speed will be made possible, or by the operation of the operating element, first a starting of the driving of the own motor vehicle will be released (that is to say a start release is carried out). Especially if an automatic starting of the driving with low speed, that is to say an automatic creep driving is taken up (here, the braking or stopping distances are still small), an uncritical automatic following operation can be realized (for example by means of a parking sensor arrangement covering the front of the own motor vehicle, and otherwise provided as a parking aid), and the operator of the motor vehicle can be entirely unburdened by the driver assistance system in traffic that is nearly standing still. The driver assistance system can be coupled with further sensors or monitoring systems, which carry out a deactivation of the driver assistance system and/or further measures upon certain actions of the operator of the motor vehicle; for example to provide safety against a nodding-off or dozing-off of the operator, or against the operator getting out during the driving of the motor vehicle, a monitoring of the motor vehicle door(s) and/or of the safety belt and/or the eyes of the operator can be carried out, and the operator can be warned by corresponding acoustic and/or optic and/or haptic or tactile signals.

The driver assistance system can be realized with existing sensor technologies for the required distance determination, for example by means of IR distance sensors or radar distance sensors). The operating element, for example embodied as a key or button (especially a multi-function key or button), is arranged in the motor vehicle preferably so as to be easily reachable by the operator of the motor vehicle, for example integrated in the steering wheel or arranged in proximity to the steering wheel.

The operator of the motor vehicle can be informed (for example acoustically and/or optically and/or haptically or tactilely) by the driver assistance system of several circumstances or conditions, especially that the driver assistance system was activated, that resting target objects are being taken into consideration in the speed regulation, that a relevant target object was detected, that an already-detected resting target object must be acknowledged or confirmed, or that a collision danger with a relevant target object exists and that a take-over by the operator of the motor vehicle is recommended, or that the start of the motor vehicle should be released.

BRIEF DESCRIPTION OF THE DRAWINGS

In the following, an example embodiment is explained in detail in connection with the drawing.

In this regard.

DETAILED DESCRIPTION OF A PREFERRED EXAMPLE EMBODIMENT AND OF THE BEST MODE OF THE INVENTION

The driver assistance system conceptualized for supporting the operator of the motor vehicle especially for the operation on highways, primary roads, and main traffic thoroughfares in cities is especially also suitable for the range of low speeds of the own motor vehicle and of the preceding vehicles (for example for traffic jam situations); that is to say a speed regulation dependent on the spacing distance to target objects classified as relevant is achieved all the way to a standstill of the own motor vehicle (speed v=0 km/h). Thus, the own motor vehicle reacts by means of the driver assistance system to every target object that is moving and classified as relevant in the own driving path or lane, and adapts itself to the speed thereof, and additionally, upon request by the operator by operating an operating element, the own motor vehicle reacts by means of the driver assistance system to target objects that are resting (stationary) and classified as relevant in the own driving path or driving lane (for example to a motor vehicle standing at the tail end of a traffic jam); moreover an automatic start of the own motor vehicle can be made possible after the standstill behind a resting target object and the removal of this target object.

The driver assistance system comprises a distance sensor as a measuring unit for measuring the spacing distance to the preceding vehicle, a vehicle regulating arrangement for prescribing the speed or the deceleration of the own motor vehicle, a rotation rate sensor for detecting the actual presently existing curve radius, a central processing unit as a control unit, and an interface to the operator of the motor vehicle with a display or indicating unit and an operating unit. The determination of the distance and/or speed and/or acceleration of target objects located in the observation or monitoring range, that is to say the determination of the spacing distance between the own motor vehicle and preceding, oncoming or stationary vehicles, persons, and other reflection objects and/or the speed of the own motor vehicle relative to preceding, oncoming or stationary vehicles, persons, and other reflection objects, and/or the acceleration of the own motor vehicle relative to preceding, oncoming or stationary vehicles, persons and other reflection objects as a basis for the driver assistance system must be determined unambiguously and with high resolution; for example the desired distance resolution amounts to 0.1 m, the desired speed resolution 0.3 m/s and the desired acceleration resolution 0.1 m/s$^2$.

Figures 1A, 1B:
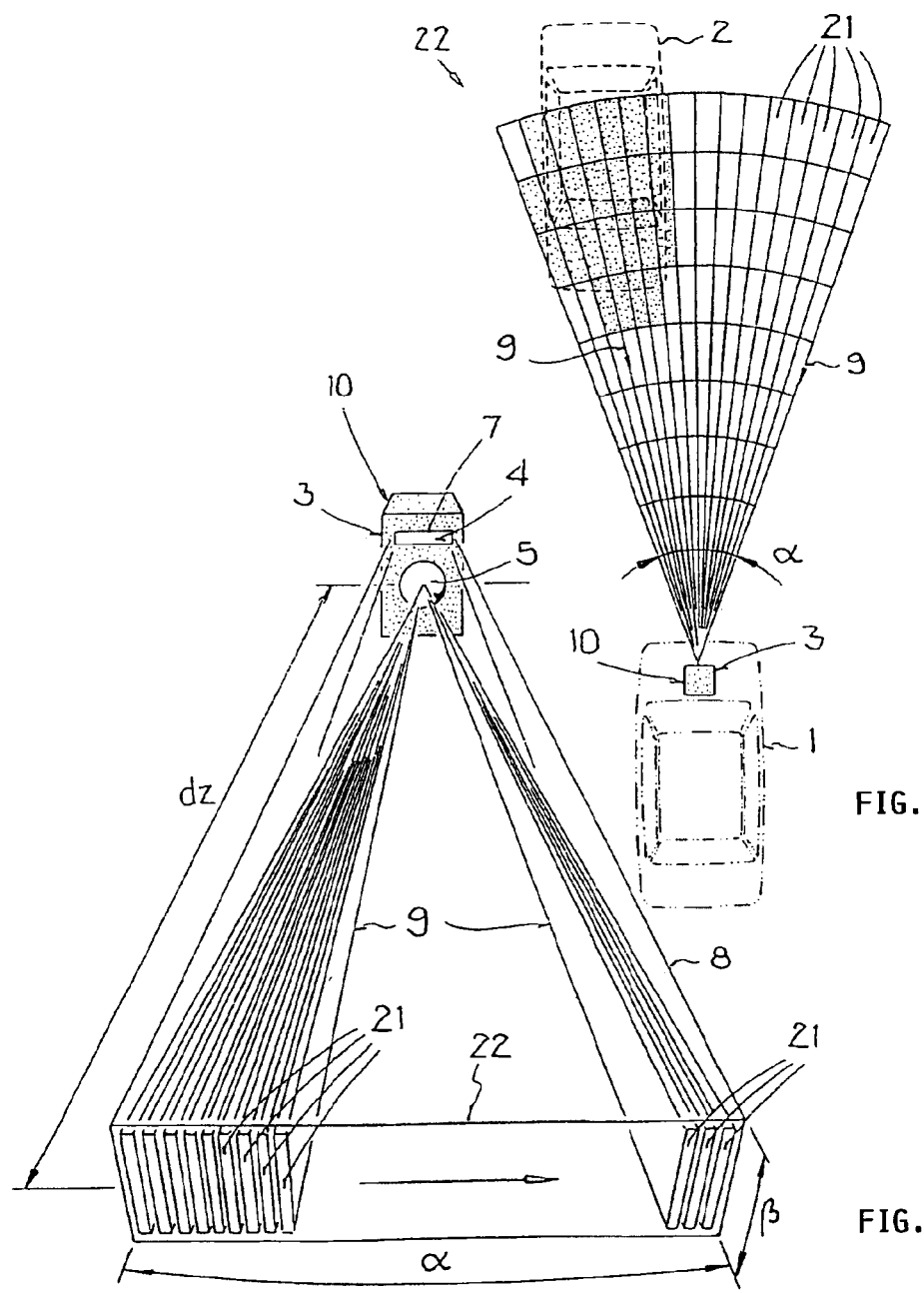
FIGS. 1A and 1B respectively show a schematic top plan view and a schematic perspective view of the underlying principle of the distance determination by means of transit time measurement.

According to the FIG. 1, the measuring system 10, for example embodied as an optical measuring system, is implemented of measuring unit 3 (transmitting unit 4, receiving unit 5) and control unit 7 (evaluating unit) on the front side of the motor vehicle 1.

In several successive measuring processes, a pulse-form transmitted signal 8 in the infrared IR spectral range with the wavelength of, for example, 850 nm, is emitted from the transmitting unit 4 of the measuring unit 3; the reflection signal 9 obtained by reflection from target objects 2 (for example the preceding vehicles or obstacles) located in the aperture field 22, that is to say in the distance range and angular range (horizontal opening angle a for example 20°; vertical opening angle β for example 3°) monitored by the pulse-form transmitted signal 8 is detected by the receiving unit 5 of the measuring unit 3 at certain time points during the pulse pause of the transmitted signal 8, as an analog received signal. The received signal is sampled at certain time points, and hereby the accuracy of the distance measurement is increased, by the control unit 7, for example a CPU (Central Processing Unit), which simultaneously functions as evaluating unit; the sampled measured values are evaluated with respect to the transit time, from which the distance information and/or by processing the distance information, the velocity information and/or the acceleration information are obtained, that is to say the spacing distance dz between the motor vehicle as reference object 1 and the reflection object as target object 2 and/or the speed of the reflection object as target object 2 and/or the acceleration of the reflection object as target object 2. The aperture field 22 or the monitored angular range (aperture angle α, β) is divided into several target sectors 21 (for example into sixteen target sectors 21) to which respectively one reflection object to be detected is allocated as target object 2, and by means of the information of which an object matrix of the target objects 2 is established.

For example, a speed dependent spacing distance regulation is carried out in the speed range from v=0 km/h to 160 km/h, whereby an activation of the driver assistance system is permitted in the speed range from v=0 km/h to 160 k/h. The range of the measuring unit 3 (of the distance sensor) amounts to 150 m, for example. As a maximum approaching speed to a target object 2 (as a maximum permissible relative speed between the own motor vehicle 1 and the target object 2), 60 km/h is prescribed, for example. The maximum deceleration rate is prescribed dependent on the own speed of the motor vehicle 1; for example 2 m/s$^2$ is permitted as a maximum deceleration rate for a speed v of the motor vehicle 1 of >50 km/h; 3 m/s$^2$ is permitted for a speed v of the motor vehicle 1 between 30 km/h and 50 km/h; and 4 m/s$^2$ is permitted for a speed v of the motor vehicle 1 of <30 km/h. For a consideration of resting target objects 2, 5 m/s$^2$, for example, is prescribed as the maximum deceleration rate independent of the speed v of the motor vehicle 1; but as an alternative hereto, the maximum deceleration rate of the motor vehicle 1 for a consideration of resting target objects 2 can be selected to be speed dependent, that is to say for smaller speeds v of the motor vehicle 1 the deceleration rate can be selected higher.

Figure 2:
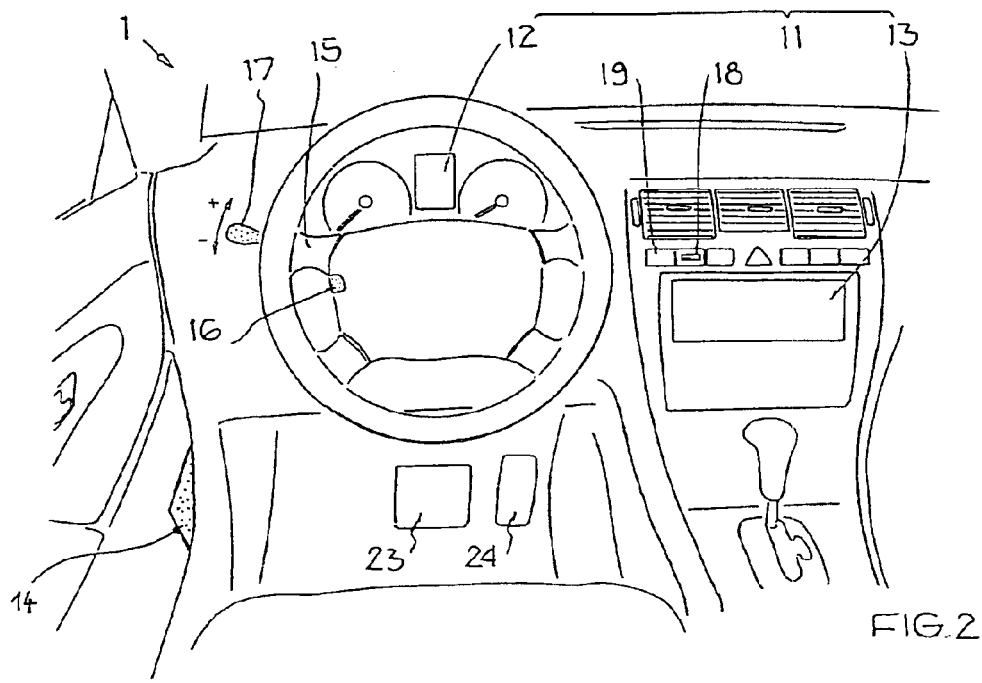
FIG. 2 shows a view of the interior space of the motor vehicle with the indicating unit and the operating unit.

In FIG. 2, a schematic view of the interior space of the motor vehicle 1 with the display or indicating unit 11 with indicating elements 12, 13, 14 and the operating unit 15 with operating elements 16, 17, 18, 19 is illustrated.

By means of the indicating unit 11 with at least one indicating element 12, 13, 14, various different system conditions of the driver assistance system and operating conditions of the motor vehicle 1 in connection with the driver assistance system can be communicated to the operator of the motor vehicle 1 in optical and/or acoustical manners (for example by means of displays, warnings lamps, control lights, buzzers, etc.). For example, with an activated driver assistance system, the following informations are provided to the operator by means of various different indicating elements 12, 13 arranged in the area of the instrument panel or dashboard of the motor vehicle 1 and a buzzer 14 arranged in the footwell area of the motor vehicle 1 (for example by blinking or continuously illuminated indicators and/or warning lamps and/or acoustical signals);

The driver assistance system is activated.

A target object 2 is detected and classified as relevant; the driver assistance system is trying to follow this target object 2 (possible target objects 2 are moving target objects and at the request of the operator also resting target objects).

The measured speed of the target object 2 and the stored maximum speed for the following operation as the set speed (with a deactivated driver assistance system, only the stored maximum speed for the following operation as the set speed).

The operation of the brakes of the motor vehicle 1 initiated by the driver assistance system with the speed regulation.

A request to the operator of the motor vehicle 1 for taking over (to intervene) in a dangerous situation; especially when a collision danger with a target object 2 having a low speed (resting or moving) exists in the driving path or lane of the motor vehicle 1.

A request to the operator of the motor vehicle 1 for starting to drive the standing motor vehicle 1 upon the removal of the target object 2, or for the release of the following operation.

By means of the operating unit 15 with at least one operating element 16, 17, 18, 19, the operator of the motor vehicle 1 can prescribe or select various different system conditions of the driver assistance system or the driving conditions. For example, the following operating elements are provided for the operator:

A switch 19 as a general on/off switch for the manual switching on and off of the driver assistance system.

An adjusting wheel 18 for prescribing the following distance (the distance dz of the own motor vehicle 1 to a target object 2 that has been detected and adapted to, that is to say classified as relevant) in the following operation, and simultaneously for prescribing the stopping distance in a standstill of the own motor vehicle 1 (the spacing distance dz of the own motor vehicle 1 to a standing target object 2 at a standstill).

An adjusting lever 17 for activating the driver assistance system with a switched-on driver assistance system (by moving the adjusting lever in the "+" direction: hereby the momentary driving speed is taken as the maximum speed or the set speed for the following operation, or in the "−" direction: hereby the last stored maximum speed is taken for the following operation or the set speed is taken for the following operation), and simultaneously for the variation of the maximum speed or the set speed for the following operation with an activated driver assistance system (for example in steps of +/−10 km/h by moving the adjusting lever in the "+" direction or in the "−" direction).

A multifunction key or button 16 for activating the driver assistance system with a switched-on driver assistance system (by pressing the multifunction button 16) for calling up or selecting resting target objects 2 as relevant target objects 2 with an activated driver assistance system (during the time duration of pressing the multifunction button 16: hereby a resting target object 2 that is detected during this time duration and classified as relevant is stored and used for the speed regulation) and for the start release with an activated driver assistance system and a standstill of the own motor vehicle 1 (by pressing the multifunction button 16: hereby either the last stored maximum speed for the following operation or the momentary driving speed is used as the maximum speed or the set speed for the following operation).

The brake pedal 23, through the operation of which the driver assistance system is deactivated (except for a continuous operation of the brake pedal 23 at a standstill of the motor vehicle 1: in this regard, a (re) activation can be achieved by pressing the multifunction button 16, whereby either the last stored maximum speed for the following operation or the momentary driving speed is used as the maximum speed or the set speed for the following operation); after releasing the brake pedal 23, the activated motor vehicle 1 first remains in the resting condition, only after the repeated operation of the multifunction button 16 (start release) it again takes up the following operation (hereby it is possible, already in the waiting condition, to adjust or set the desired maximum speed or set speed for the following operation).

The gas pedal 24, through the operation of which all functions of the driver assistance system are suspended until the release of the gas pedal 24.

Figure 3:
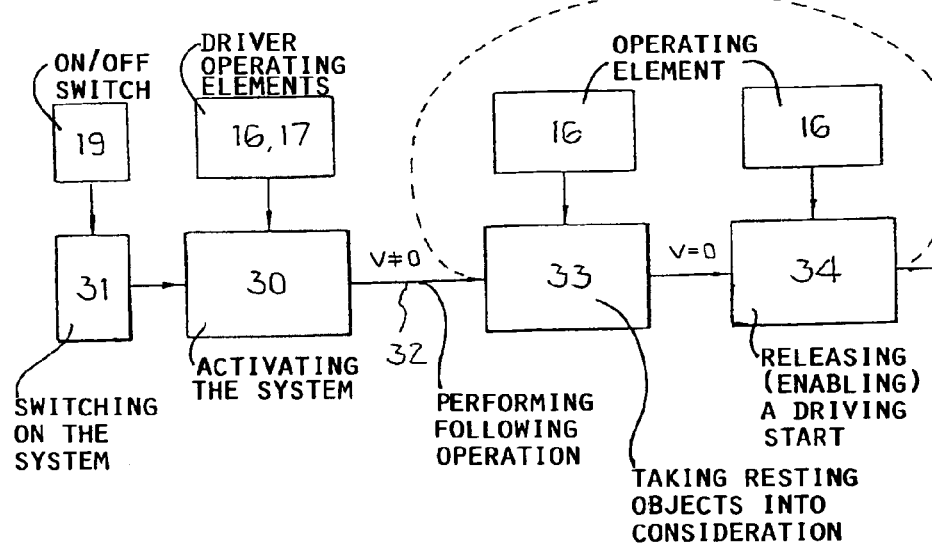
FIG. 3 shows a schematically simplified process plan or flow diagram for the functional operation of the driver assistance system.

In the FIG. 3, the various different functional conditions of the driver assistance system are schematically illustrated.

Activation 30 of the Driver Assistance System:

After switching-on 31 of the driver assistance system through operation of the switch (on/off switch) 19 with a switched-off driver assistance system, the driver assistance system can be activated by operation of the adjusting lever 17 or by pressing the multifunction button 16 in the speed range between 0 km/h and 160 km/h, especially also after a standstill of the own motor vehicle 1 with continuous operation of the brake pedal 23; either the last stored maximum speed for the following operation 32 or the momentary driving speed is used as the maximum speed or set speed for the following operation 32. A successful activation of the driver assistance system is communicated to the operator of the motor vehicle 1, for example by an optical and/or acoustical signal.

The activation 30 of the driver assistance system is not possible when the speed of the motor vehicle 1 is higher than 160 km/h or when the brake pedal 23 is operated (except for a continuous operation of the brake pedal 23 in a standstill of the own motor vehicle 1).

Following operation 32:

With an activated driver assistance system, either a speed regulation analogous to a cruise control is carried out, if no target object 2 has been detected or no target object 2 has been classified as relevant, or a spacing distance dependent speed regulation is carried out behind a target object 2 that has been detected and evaluated as relevant, with a following spacing distance prescribed by means of the adjusting wheel 18 up to a standstill of the own motor vehicle 1, that is to say the own motor vehicle 1 stops behind the target object 2 that has been detected and evaluated as relevant, if it stops within the range of the measuring unit 3 (of the distance sensor) of for example 150 m.

A warning to the operator of the motor vehicle 1 is carried out for target objects 2 that are standing still and evaluated as relevant, as well as upon recognizing dangerous situations, especially when an intervention of the operator of the motor vehicle 1 becomes necessary, for example when approaching a vehicle with a relative speed between the own motor vehicle 1 and the target object 2 that is too great for the driver assistance system, or upon the detection of a stationary obstacle in the own driving path or lane.

The prescribed set speed as the maximum speed for the following operation 32 can be changed at any time with an activated driver assistance system by operation of the adjusting lever 17, for example in steps of 10 km/h by operation of the adjusting lever in the "+" direction or the "−" direction; with a prescribed input of 0 km/h as the set speed, the own motor vehicle 1 will be slowly braked to a standstill (automatic stopping without target object 2).

Consideration of resting target objects 33:

The approach to an already stationary obstacle is more likely the exception in normal driving operation; each target object 2 with a very low speed (for example<5 km/h) or very low speed component in the driving direction of the own motor vehicle 1 will be evaluated as a resting target object 2, for example a standing vehicle at the end of a traffic jam or a pedestrian or a motor vehicle crossing into the own driving path or lane.

Upon pressing the multifunction button 16, these resting target objects 2 will be taken into consideration in the distance dependent speed regulation during the operation duration of the multifunction button 16, so that, after a confirmation that a resting target object 2 has been detected and classified as relevant, which is acoustically and/or optically communicated to the operator of the motor vehicle 1, the motor vehicle 1 will stop behind this resting target object 2.

Starting release 34:

After a standstill of the own motor vehicle 1, the driver assistance system is activated with a stored maximum speed for the following operation 32 (set speed) of >0 km/h. Upon pressing the multifunction button 16, the motor vehicle 1 accelerates up to the stored maximum speed for the following operation 32 (set speed), if applicable, with consideration of a new target object 2, if no obstacle is located in front of the own motor vehicle 1. If, to the contrary, an obstacle is located in front of the own motor vehicle 1, the motor vehicle 1 will remain standing; after the removal of the obstacle or target object 2, the operator of the motor vehicle 1 can prescribe a new start release by pressing the multifunction button 16 (if the operator does not take any steps within a short time span after the removal of the obstacle or target object 2, for example within 2 seconds, he will be requested or urged, for example through an acoustical signal, to provide the start release 34).

Overriding of the driver assistance system by the operator:

The operator of the motor vehicle 1 maintains the complete control over the motor vehicle 1 at all times. Upon an operation of the gas pedal 24, all functions of the driver assistance system rest until the release of the gas pedal 24; if thereby the operator accelerates the motor vehicle 1 to a speed value v that differs by a certain amount $\Delta v$ from the stored maximum speed for the following operation 32 (set speed) (for example by more than 20 km/h greater than the stored maximum speed for the following operation 32), in order to avoid abrupt braking processes upon release of the gas pedal 24, the stored maximum speed for the following operation 32 is correspondingly adjusted by $\Delta v$. Upon an operation of the brake pedal 23, the driver assistance system is deactivated and must again be reactivated by the operator (if desired).

Deactivation of the driver assistance system:

With an activated driver assistance system, the driver assistance system is deactivated by operation of the brake pedal 23, especially also after a standstill of the own motor vehicle 1 upon releasing the brake pedal 23, which was being pressed by the operator, and a renewed pressing-down of the brake pedal 23.

With a switched-on driver assistance system, through operation of the on/off switch 19, the driver assistance system can be switched off.

Upon recognizing non-specified operating conditions or undefined situations (for example due to a slippery roadway surface, for example as a result of ice on the roadway), the driver assistance system autonomously deactivates itself and provides an acoustical and/or optical and/or haptic or tactile warning signal to the operator of the motor vehicle 1.

What is claimed is:

1. Method for the operation of a driver assistance system for motor vehicles (1),
   in which, in a following operation (32) of a motor vehicle (1) following another vehicle, a speed regulation of the speed of the motor vehicle (1) dependent on the spacing distance (dz) to target objects (2) that have been detected and classified as relevant is carried out,
   characterized in that the relevant target objects (2) taken into account for the speed regulation in the following operation (32) are selected by an operation of an operating element (16) by an operator of the motor vehicle (1), and
   characterized in that, in the selection of the relevant target objects (2) taken into account for the speed regulation, only moving target objects are taken into account in a first operating condition, and both moving target objects and resting target objects are taken into account in a second operating condition, and switching between said first and second operating conditions is effectuated by the operation of the operating element (16) by the operator of the motor vehicle (1).

2. Method according to claim 1, characterized in that, in the selection of the relevant target objects (2) taken into account for the speed regulation, all resting target objects (2) that are detected and classified as relevant are taken into consideration.

3. Method according to claim 1, characterized in that resting target objects (2) are taken into consideration in the selection of the relevant target objects (2) taken into account for the speed regulation, only during the operation of the operating element (16) carried out by the operator of the motor vehicle (1).

4. Method according to claim 1, characterized in that resting target objects (2) are taken into consideration in the selection of the relevant target objects (2) taken into account for the speed regulation, for a short time span after the operation of the operating element (16) carried out by the operator of the motor vehicle (1).

5. Method according to claim 1, characterized in that the resting target objects (2) that were detected already before the operation of the operating element (16) are classified as relevant target objects (2) by the operation of the operating element (16) carried out by the operator of the motor vehicle.

6. Method according to claim 5, characterized in that the resting target objects (2) that were detected already before the operation of the operating element (16) are indicated to the operator of the motor vehicle (1), and are acknowledged by the operator of the motor vehicle (1) by the operation of the operating element (16).

7. Method according to claim 1, characterized in that all target objects (2) classified as relevant are taken into account for the speed regulation until the deactivation of the driver assistance system.

8. Method according to claim 1, characterized in that, during the consideration of resting target objects (2) in the selection of the relevant target objects (2) taken into account for the speed regulation, the regulation values of the driver assistance system upon which the following operation (32) is based are varied in such a manner that the regulation time and/or the reaction time of the speed regulation is shortened.

9. Method according to claim 8, characterized in that, during the consideration of resting target objects (2) in the selection of the relevant target objects (2) taken into account for the speed regulation, at least one of the following features is provided:
    faster changes of the regulation values in the speed regulation are permitted,
    the regulation values are set to a critical threshold value, and
    a redundancy for the speed regulation is reduced.

10. Method according to claim 8, characterized in that, during the consideration of resting target objects (2) in the selection of the relevant target objects (2) taken into account for the speed regulation, at least one of the following features is provided:
    a maximum spacing distance (dz) for the detection of target objects (2) is expanded,
    a number of measuring cycles used for the classification of the target objects (2) is reduced,
    a change of a deceleration of the motor vehicle (1) is increased, and
    a maximum permissible deceleration of the motor vehicle (1) is increased.

11. Method according to claim 1, characterized in that, during the consideration of resting target objects (2) in the selection of the relevant target objects (2) taken into account for the speed regulation, upon the detection of a resting target object (2), a return notification to the operator of the motor vehicle (1) takes place.

12. Method according to claim 1, characterized in that, upon recognizing a collision danger with a relevant target object (2), a return notification to the operator of the motor vehicle (1) takes place.

13. Method according to claim 1, characterized in that at least one of an acoustical, optical, haptic or tactile return notification to the operator of the motor vehicle (1) takes place.

14. Method according to claim 1, characterized in that an activation of the driver assistance system is carried out by operation of the operating element (16) with a deactivated driver assistance system.

15. Method according to claim 1, characterized in that the following operation (32) is released by operation of the operating element (16) after the standstill of the motor vehicle (1) behind a relevant target object (2).

16. Method according to claim 15, characterized in that the operating element (16) must be operated by the operator of the motor vehicle (1) directly after the removal of the relevant target object (2) for releasing the following operation (32).

17. Method according to claim 15, characterized in that, after the removal of the relevant target object (2), the motor vehicle (1) automatically transitions into a creeping driving with speed regulation, and in that the following operation (32) with normal speed is released by the operation of the operating element (16).

18. Method according to claim 1, characterized in that the operation of the operating element (16) is carried out on a steering wheel of the motor vehicle (1).

19. Method according to claim 1, characterized in that a button is operated as the operating element (16).

20. A method of operating a motor vehicle having a driver assistance system including an operating element to be operated by a driver of the motor vehicle, said method comprising:
    a) driving said motor vehicle at a driving speed according to a following mode of said driver assistance system, in which said motor vehicle follows another vehicle located ahead of said motor vehicle;
    b) detecting target objects located ahead of said motor vehicle, including substantially stationary target objects having a speed below a specified threshold and moving target objects having a speed at or above said specified threshold;
    c) evaluating and respectively classifying at least some of said target objects as relevant target objects or non-relevant target objects;
    d) determining a spacing distance between said motor vehicle and at least one of said relevant target objects;
    e) regulating said driving speed dependent on said spacing distance; and
    f) in response to and dependent on an operation of said operating element by said driver, selecting and activating a respective desired one of and switching between:
        a first operating condition of said following mode in which only said moving target objects are considered for said classifying as said relevant target objects, and
        a second operating condition of said following mode in which both said moving target objects and said substantially stationary target objects are considered for said classifying as said relevant target objects.

21. The method according to claim 20, wherein said specified threshold is a speed value not more than 5 km/h.

22. The method according to claim 20, wherein said second operating condition is activated only during an active operation of said operating element by said driver, and otherwise said first operating condition is activated.

23. The method according to claim 20, wherein said second operating condition is activated only during and for a predetermined limited time following an active operation of said operating element by said driver, and otherwise said first operating condition is activated.

24. The method according to claim 20, wherein said driver assistance system further includes a switch element distinct from said operating element, and said method further comprises a preliminary step of actuating said following mode in response to and dependent on an actuation of said switch element by said driver.

25. The method according to claim 20, further comprising a preliminary step of activating said driver assistance system from a switched-off state in response to and dependent on an operation of said operating element by said driver.

26. The method according to claim 20, further comprising, after a standstill of said motor vehicle with said driving speed being equal to zero, re-enabling and resuming said following mode with said driving speed being greater than zero in response to an operation of said operating element by said driver.

* * * * *

UNITED STATES PATENT AND TRADEMARK OFFICE
CERTIFICATE OF CORRECTION

PATENT NO. : 6,945,346 B2
DATED : September 20, 2005
INVENTOR(S) : Massen

It is certified that error appears in the above-identified patent and that said Letters Patent is hereby corrected as shown below:

Title page,
Item [86], §371 (c)(1), (2), (4) Date, replace "Mar. 7, 2002" with -- Mar. 7, 2003 --,
Item [56], References Cited, FOREIGN PATENT DOCUMENTS,
replace "EP     0590588 A2" with -- EP     0590588 B2 --,
replace "EP     07820008" with -- EP     0782008 --, Column 6,
Line 23, after "opening angle" replace "a" with -- $\alpha$ --, Column 7,
Line 13, after "displays," replace "warnings" by -- warning --.

Signed and Sealed this

Seventh Day of February, 2006

JON W. DUDAS
*Director of the United States Patent and Trademark Office*